US011272097B2

(12) United States Patent
Demers

(10) Patent No.: US 11,272,097 B2
(45) Date of Patent: Mar. 8, 2022

(54) AESTHETIC LEARNING METHODS AND APPARATUS FOR AUTOMATING IMAGE CAPTURE DEVICE CONTROLS

(71) Applicant: Steven Brian Demers, Manchester, NH (US)

(72) Inventor: Steven Brian Demers, Manchester, NH (US)

(73) Assignee: Steven Brian Demers, New Boston, NH (US)

( * ) Notice: Subject to any disclaimer, the term of this patent is extended or adjusted under 35 U.S.C. 154(b) by 30 days.

(21) Appl. No.: 16/943,655

(22) Filed: Jul. 30, 2020

(65) Prior Publication Data

US 2022/0038620 A1 Feb. 3, 2022

(51) Int. Cl.
*H04N 5/232* (2006.01)
*G06K 9/62* (2006.01)
*G06K 9/46* (2006.01)
*G06T 7/70* (2017.01)

(52) U.S. Cl.
CPC .......... *H04N 5/23222* (2013.01); *G06K 9/46* (2013.01); *G06K 9/6215* (2013.01); *G06K 9/6256* (2013.01); *G06K 9/6262* (2013.01); *G06K 9/6267* (2013.01); *G06T 7/70* (2017.01); *H04N 5/23218* (2018.08); *G06T 2207/20084* (2013.01); *G06T 2207/30244* (2013.01)

(58) Field of Classification Search
CPC .. H04N 5/23222; H04N 5/23218; G06K 9/46; G06K 9/6215; G06K 9/6256; G06K 9/6262; G06K 9/6267; G06K 9/6257; G06K 9/6259; G06K 9/036; G06K 9/4628; G06K 9/6271; G06K 9/6202; G06K 9/6212; G06K 9/627; G06N 3/0454; G06N 3/08; G06N 3/084; G06N 3/04; G06N 3/088; G06N 3/082; G06N 3/02; G06N 3/0445; G06N 3/0472; G06N 3/0481; G06T 7/70; G06T 2207/20084; G06T 2207/30244; G06T 2207/20081; G06T 2207/30168
See application file for complete search history.

(56) References Cited

U.S. PATENT DOCUMENTS 8,125,557 B2 * 2/2012 Chen ...................... G06K 9/036
348/333.04
10,885,387 B1 * 1/2021 Kim ......................... G06K 9/46
(Continued)

*Primary Examiner* — Michael S Osinski

(57) ABSTRACT

Methods and systems for generating image capture device parameter suggestions that would produce an image in, or closer to, a desired aesthetic style. In particular, the systems and methods described herein include pattern recognition techniques which are utilized to extract visual features from a set of images, those features defining an aesthetic style. The set of images comprise exemplars of said aesthetic style as well as images representing a plurality of variations in image capture parameters. An algorithm is trained to discriminate between exemplar and variation images based on their extracted visual features. When the system is presented with an input image the same visual features are extracted from it and are compared to the characteristic visual features of the exemplar and variation images with the trained discriminator algorithm. The similarity of the input image to exemplar and variation images are used to generate image capture device parameter suggestions.

20 Claims, 7 Drawing Sheets

(56) References Cited

U.S. PATENT DOCUMENTS

| | | | |
|---|---|---|---|
| 2011/0154172 A1* | 6/2011 | Lee | H04N 17/004 |
| | | | 714/819 |
| 2011/0282867 A1* | 11/2011 | Palermiti, II | G06F 16/5866 |
| | | | 707/722 |
| 2014/0247342 A1* | 9/2014 | Ellenby | H04N 5/23222 |
| | | | 348/135 |
| 2015/0288870 A1* | 10/2015 | Nagaraja | H04N 5/23218 |
| | | | 348/333.02 |
| 2015/0288874 A1* | 10/2015 | Sivan | G06K 9/00201 |
| | | | 348/207.11 |
| 2018/0322367 A1* | 11/2018 | Chang | G06K 9/4604 |
| 2018/0373999 A1* | 12/2018 | Xu | G06K 9/00765 |
| 2019/0066493 A1* | 2/2019 | Sohn | G08G 1/0129 |
| 2019/0205649 A1* | 7/2019 | Ananthanarayanan | |
| | | | G06K 9/6256 |
| 2019/0228264 A1* | 7/2019 | Huang | G06K 9/40 |
| 2020/0150940 A1* | 5/2020 | Li | G06F 8/443 |
| 2020/0265553 A1* | 8/2020 | Kim | G06T 3/4038 |
| 2021/0012476 A1* | 1/2021 | Miyazawa | G01N 21/88 |
| 2021/0042580 A1* | 2/2021 | Chen | G06T 3/4046 |
| 2021/0064907 A1* | 3/2021 | Yang | G06K 9/6256 |
| 2021/0118112 A1* | 4/2021 | Huang | G06K 9/62 |
| 2021/0166066 A1* | 6/2021 | Ando | G06K 9/6272 |
| 2021/0209387 A1* | 7/2021 | Nikitidis | G06K 9/00221 |
| 2021/0217152 A1* | 7/2021 | Gupta | G06T 5/40 |
| 2021/0224607 A1* | 7/2021 | Deng | G06N 3/084 |
| 2021/0233239 A1* | 7/2021 | Li | G16H 40/63 |
| 2021/0264210 A1* | 8/2021 | Ueta | G06K 9/78 |
| 2021/0264236 A1* | 8/2021 | Xu | G06T 11/00 |
| 2021/0271979 A1* | 9/2021 | Othmezouri | G06K 9/627 |
| 2021/0272341 A1* | 9/2021 | Swaminathan | G06T 7/11 |
| 2021/0303968 A1* | 9/2021 | Donsbach | H04N 5/23216 |
| 2021/0312233 A1* | 10/2021 | Mishima | G06T 7/50 |

* cited by examiner

AESTHETIC LEARNING METHODS AND APPARATUS FOR AUTOMATING IMAGE CAPTURE DEVICE CONTROLS

TECHNICAL FIELD

The present disclosure relates generally to the automated analysis of images. More specifically, one or more embodiments of the present disclosure relate to systems and methods to automatically inferring parameter settings for image capture devices to better capture a desired aesthetic though pattern recognition techniques applied to learn the defining visual features of a corpus of images.

BACKGROUND

Digital photography has led to an explosion in the amount of images being captured worldwide. Aided by the advancement of digital cameras and the general capabilities of electronic devices in general, many individuals and businesses are capturing digital images for an ever-increasing variety of purposes. For many of these applications it would be impractical to have an operator dedicated to control the diversity and amount of control parameters needed to capture quality images. For example, the control parameters may relate to camera platforms (e.g., automated digital cameras, camera-equipped drones, motorized mounted cameras, robots), lighting rigs, and motion control stages (as used for image subject positioning). Even in those situations where it is convenient to have an operator for one or more of these devices, most users are amateurs and would benefit from guidance in order to capture "good" images.

Over the years, camera manufacturers and application developers have introduced many automated ways to assist users capture "good" images such as auto-focus, auto-exposure, auto-flash, white balance, face detection and so on. These are all meant to assist a camera user (either a human operator or an automated camera platform) to produce higher quality images. However they often rely on 'one size fits all' rules which depend on pre-determined assumptions about what makes a "good" image. For example, auto-focus correction is conventionally based on the frequency content of the assumed subject and background of an image. Similarly, white balance conventionally depends on a 'baked-in' algorithm which attempt to set the average color temperature of a captured image to a pre-set value.

Image composition has traditionally been harder to automate with a pre-defined set of rules but composition plays a key role in generating high quality images. Conventionally, automated camera platforms which can control one or more of their position, orientation, zoom, and focus are simply directed to keep a predetermined area in view or to keep a particular object centered in the camera view. These pre-defined and simplistic rules can be overly restrictive for many applications, especially where capturing an aesthetically pleasing image is important. The technique in U.S. Pat. No. 10,277,806 to Artincam 2019 Apr. 30 determines camera composition suggestions based purely on a pre-defined set of general composition rules. Though more sophisticated than typical camera automation, this technique is equally restrictive and provides no easy way to modify these rules to adapt for different desired aesthetics.

Furthermore, it would be often be convenient to define a new aesthetic style through example images rather than tediously and exhaustively specifying pre-set rules of capture or composition which typically require great technical and artistic expertise in all but the simplest aesthetic examples. Aesthetic analysis of images conventionally relies on a human-rated database of images which are analyzed to define a rating algorithm. Techniques such as in patent publication 20170294010 to Adobe Systems Incorporated 2017 Oct. 12, are limited to scoring images according to how aesthetically pleasing they are (i.e. how similar they are to highly-rated images). These techniques do not give parameter suggestions for how to control the image capture devices to obtain "better" images.

These and other problems exist with regard to automated control of image capture devices to achieve a desired aesthetic.

BRIEF SUMMARY

The following embodiments and aspects thereof are described and illustrated in conjunction with a system, tools and methods which are meant to be exemplary and illustrative, not limiting in scope.

Introduced herein are techniques and technologies for automatically generating image capture device parameter suggestions that would produce an image with, or closer to, a desired aesthetic style. In particular, one or more aspects of the systems and methods described herein include pattern recognition techniques utilized to train an algorithm that learns to extract visual features from a set of images presented to the system, those features defining an aesthetic style. Said set of images contain exemplars of an aesthetic style as well as images representing a plurality of variations in image capture parameters from an exemplar. For example, variations may include "camera shifted left" or "keylight two stops overexposed" images. An algorithm is trained to discriminate between exemplar and variation images based on the extracted visual features of said set of images. When the system is presented with an unseen input image the same visual features are extracted from this image and are compared to the characteristic visual features of the exemplar and variation images with the trained discriminator algorithm. The similarity of the input image to exemplar and variation images are used to generate image capture device parameter suggestions.

The methods and systems may employ machine learning techniques that classify the input image as having a plurality of variation characteristics and/or perform a regression to further determine the amount of variation present as well. These machine learning techniques may comprise neural networks in whole or as part of the trained algorithms. In some embodiments the feature extraction and discriminator algorithms are trained separately, in other embodiments they are trained jointly as a single algorithm; this choice may depend on which method results in the most accurate discrimination between exemplar and variation images.

In some embodiments, multiple aesthetic styles may be defined, each generating an image capture suggestion according to the methods and systems discussed herein. In some embodiments, the methods may further comprise determining the similarity of the unseen input image to one or more aesthetic styles. This similarity measure may be used to combine the image capture suggestions from each aesthetic style into a composite image capture suggestion which is delivered to a user. In some embodiments, the user is a human operator and the image capture suggestions are displayed in realtime on a display device. In some embodiments, the user is a human operator and the image capture suggestions are recorded on tangible, computer-readable medium in which the suggestions are non-transitorily stored. In some embodiments, the user is an automated camera and the suggestions comprise one or more parameters of said camera (such as focal length, position, and exposure) which can be automatically controlled. In some embodiments, the user is an automated lighting rig and the suggestions comprise one or more parameters of an automated light (such as intensity, color, and timing). In some embodiments, the image capture suggestions comprise one or more suggestions as to the placement and/or orientation of the subject of the input image.

Additional features and advantages of exemplary embodiments of the present disclosure will be set forth in the description which follows, and in part will be obvious from the description, or may be learned by the practice of such exemplary embodiments.

BRIEF DESCRIPTION OF DRAWINGS

Exemplary embodiments are illustrated in referenced figures. These examples cannot be considered as limiting the scope of the invention.

DETAILED DESCRIPTION

Figure 1:
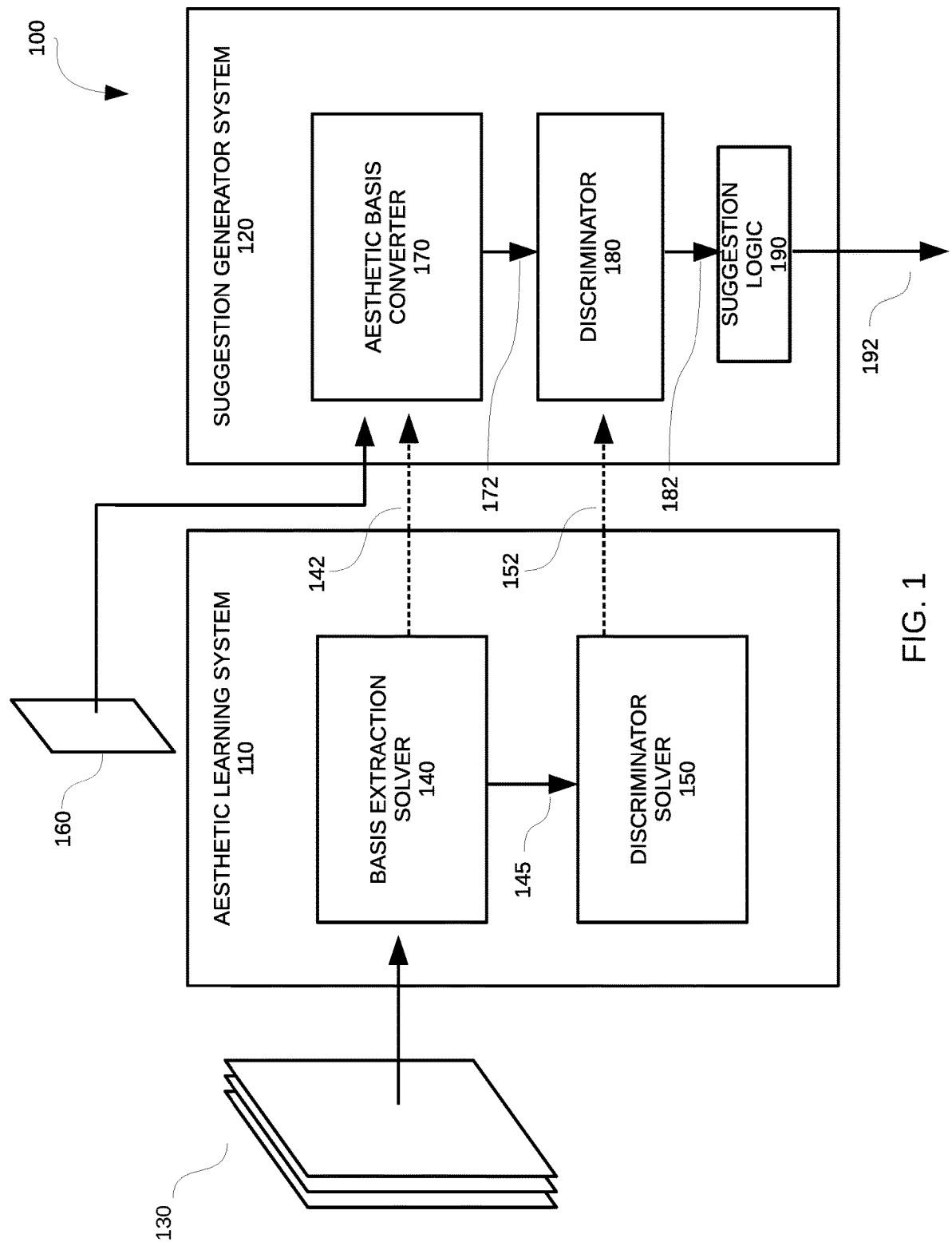
FIG. 1 is a block diagram illustrating an example embodiment of an environment in which example embodiments may be employed.

One or more embodiments of the present disclosure include a system and method for generating image capture device parameter suggestions through analysis of a captured digital image. Said suggestions (for example, "move camera left" or "increase key light one stop") may produce an image with, or closer to, a desired aesthetic style. In particular, in one or more embodiments, pattern recognition techniques are utilized to extract visual features from a set of images presented to the system, the set of images defining the essential features of an aesthetic style. Thereby, the methods and systems described may allow a user to easily and naturally specify an aesthetic style which may otherwise necessitate creating many elaborate rules potentially requiring significant technical and/or artistic skill. In some embodiments, the methods and systems described may allow the user to easily capture a desired aesthetic without having to micromanage many different parameters of devices which may include automated camera platforms, automated lighting equipment, and the subjects of an image capture (as either positioning of a subject through a motion control stage or displaying the suggestions to a human subject of an image who can then move accordingly). In some embodiments it may assist non-professional photographers to improve their images by presenting the image capture suggestions on a viewfinder of a camera.

The description herein includes methods, apparatus, and software programs that exemplify illustrative embodiments of the present invention. In the following description, for purpose of explanation, numerous specific details are set forth in order to provide an understanding of various embodiments of the inventive subject matter. It will be evident, however, to those skilled in the art that embodiments of the inventive subject matter may be practiced without these specific details. In general, well-known protocols, structures, and techniques have not been shown in detail.

Example embodiments described herein provide methods, systems, and apparatus for automatically generating image capture device parameter suggestions (referred to as "image capture suggestions" herein) from analysis of a captured image presented to the system. These image capture suggestions are in the form of parameter specifications for camera, lighting, or image subject controls, either in absolute (e.g., change focal length of camera to three meters) or relative (e.g., shift camera one meter to the left) terms. These suggestions, if followed, may produce a new image with, or closer to, a specified aesthetic style. The aesthetic style is defined by providing a set of images to the system containing desired aesthetic features. These images may consist of exemplars of a given aesthetic as well as potentially possessing a plurality of variations in image capture device parameters from an exemplar image. These images are analyzed in order to determine the salient factors that differentiate these images from images not in the set and between images within the set such as representing one or more variations in image capture parameters. A "unseen" image can then be presented to the system which is similarly analyzed to detect any exemplar or variation characteristics within it. These characteristics are then used to generate image capture suggestions (i.e. characteristics are mapped to image capture suggestions) for the newly presented "unseen" image.

The image capture suggestions are given in terms of one or more image capture parameters to be adjusted. The term "image capture parameters", as referred to herein, may relate to any factor that sets the condition of operation of an image capture device and may include camera, lighting, or subject controls. In some embodiments these suggestions may include a plurality of camera parameters such as position, zoom, exposure, and focal distance. In some embodiments lighting parameters may be suggested, for example the ratios and color of fill, rim, and key lights. In some embodiments image subject parameters (i.e. parameters dealing with the subject of an image composition, for example a person or a miniature) may be suggested such as subject positioning with respect to the camera or with respect to another object in the scene.

In some embodiments, the image capture suggestions generated by the methods, systems, and apparatus described herein may be used to control an automated camera platform (i.e. a camera that can automatically control a plurality of its characteristics which may consist of parameters such as focal length, zoom, exposure, position, and orientation among others). In some embodiments the image capture suggestions can be used to control a robotic platform containing a camera such as a drone or motorized camera mounted system. In some embodiments these suggestions may be used to control an automated lighting platform (i.e. an apparatus that allows automated control of one or more scene lights). By using the image capture suggestions to control one or more aspects of these automatic platforms a user can easily capture images with a specific aesthetic style that would otherwise require defining complex rules and require great technical and/or artistic skill.

In some embodiments the image capture suggestions are presented to a human operator of a camera system in real-time, allowing even non-professional photographers to capture images with a specific aesthetic style. In some embodiments the image capture suggestions may relate to the subject of the image (i.e. a person in a portrait image) and may be presented to the camera operator and/or the subject to give guidance to subject positioning to achieve a desired aesthetic style. In some embodiments the image capture suggestions may be presented to a human operator or human image subject through a graphical user interface (GUI) or another suitable display device such as a light emitting diode (LED). In some embodiments (e.g., as in an automated camera) the image capture suggestions may be superimposed on a preview image of the current camera view in a GUI. In some embodiments, the image capture suggestions are non-interactive and may be generated from an image a significant time after the image had been captured and recorded on a tangible machine-readable memory device.

The term "aesthetic style", as referred to herein, relate to the similarities amongst a set of images that allow distinction to be made from other images not in the set. Generally these may consist of such elements as the subject of an image, lighting, scene composition, color palette, and contrast among other factors. Some examples of an aesthetic style may include profile portraits of a single person with a specific composition or beach landscapes at sunset with a low horizon line. The aesthetic style defines the aesthetic qualities the system is attempting to replicate via a new image capture action utilizing a plurality of image capture suggestions generated by the system described herein. These aesthetic qualities may be targeted in part or on average. For example, the set of images provided to the system to define an aesthetic may comprise a plurality of portrait images with desired aesthetic features such as a profile shot, blank background, high-contrast lighting, shallow depth of field, and a particular type of symmetry. The image capture suggestions generated by the system may lead to a new image that would be closer to (i.e. possess a higher degree of) one or more of these aesthetic features if the suggestions are utilized to direct the capture of said new image.

In the embodiments of this invention an aesthetic style is defined by a plurality of images presented to the system for this purpose; these images are referred to herein as the "aesthetic image set". Images within the aesthetic image set are either exemplars of the aesthetic style (herein referred to as "exemplar images") or images that represent an exemplar of the aesthetic style except differing in one or more image capture parameters (herein referred to as "variation images"). For example, variation images may be provided to the system which are similar to exemplar images except the camera has been translated to the right three meters. In some embodiments the images may be labelled as to any variation in image capture parameters they represent.

The aesthetic image set is analyzed through pattern recognition techniques to learn which features are common to the images in the set and are salient to distinguish between exemplar images and non-exemplar images both within and without the aesthetic image set (these features are referred to as "aesthetic features" herein). Aesthetic features may include important points, edges, and shapes. Aesthetic features may include higher-level features such as textures, objects, faces, clouds, and may include portions of these objects. Aesthetic features may include frequency domain features via methods such as Fourier Analysis. Aesthetic features may include properties of these features such as their arrangement, proportion, and symmetry. Aesthetic features may include properties of an image such as contrast, symmetry, and identified content. Once learned from the aesthetic image set, the set of all derived aesthetic features form a basis (i.e. "latent space") that may be used to describe any image presented to the system, this set of features are referred to as the "aesthetic basis" herein.

An image presented to the system to have an image capture suggestion generated is referred to as an "input image" herein. After an input image has been converted to the aesthetic basis (i.e. expressed in terms of the features that make up the aesthetic basis) then the features of the input image may be compared to the features that exemplar images and variation images possess in a statistical manner. The analysis of the similarities and differences between the input image features and the features corresponding to exemplar images or one or more variation images allow the system to describe the input image as possessing qualities similar to exemplar images and/or a plurality variation images (i.e. as possessing exemplar or specific variation "character"). By determining an input image has a plurality of exemplar and variation characteristics the system can subsequently determine which plurality of image capture parameter variations from an exemplar of the aesthetic style an input image may possess in whole or part. For example, in some embodiments, after an image has been converted to the aesthetic basis it may be described in terms of possessing one or more image capture parameter variations from an exemplar image (e.g., "overexposed" or "camera shifted right"). In some embodiments, when an image has been converted to the aesthetic basis it may more simply be described as possessing exemplar qualities or non-exemplar qualities (i.e. "good" or "bad").

The exemplar and variation character an input image is determined to possesses give rise to image capture suggestions through a mathematical or logic function, herein referred to as the "suggestion generation function". In some embodiments the suggestion generation function may be as simple as the inverse of an identified variation character in the input image (e.g., if the input image is determined to possess "camera shifted right" variation character then the image capture suggestion would be "shift camera left"). In some embodiments the image capture suggestion may be the result of a weighted average of a plurality of variation characteristics that an input image is determined to possess.

In conventional systems the determination of whether an image conforms to a desired aesthetic depend in whole or in part on predetermined rules of what defines an exemplar of an aesthetic style. These predetermined rules may include the application of image composition rules like the "rule of thirds", "rule of golden ratio", or "rule of clean perimeter". These predetermined rules may include specification of the frequency content of foreground and background objects (e.g., as in a camera autofocus system). These predetermined rules may include specifying particular objects should be present in a specific arrangement (e.g., facial features such as eyes should be in the center of a portrait image). In contrast, the methodology and systems described herein determine (i.e. "learn") aesthetic features and the specifications for what constitutes an exemplar of an aesthetic style entirely from the content of the aesthetic image set. It is not necessary to specify any "a priori" rules or logic of what defines an exemplar (i.e. "good") image of a target aesthetic style. In some embodiments the learned rules may be supplemented by pre-determined ones, but this is not necessary for the invention specified herein.

In some embodiments the system may work on a succession of input images. For example, operating within an automated camera platform (i.e. a camera which can automatically change a plurality of camera characteristics such as focus, zoom, position), an input image is received and subsequently analyzed to generate an image capture suggestion. The automated camera may be adjusted according to the suggestion and then a new image captured. This image may be received by the system as an input image which may be analyzed in the same way and the process may be repeated until the system evaluates that an input image is within some tolerance of possessing only exemplar characteristic.

In some embodiments more than one aesthetic style can be defined and used to generate image capture suggestions. Most of the subsequent discussion of the invention herein refers to a single aesthetic for succinctness. However, it should be understood that it is straightforward to generalize this invention to incorporate multiple aesthetic styles concurrently (i.e. an image capture suggestion may be generated from each aesthetic style either in a series or parallel computation). The overall image capture suggestion generated by a system utilizing multiple aesthetic styles may be given as some logical or mathematical function (such as a weighted average or min/max function) of the image capture suggestions resulting from each aesthetic style separately.

In some embodiments where there is more than one aesthetic style to be used concurrently, there may be an analysis performed on the input image to determine which aesthetic style, or combination thereof, to use. This analysis may involve determining how similar the input image is to a plurality of aesthetic styles. Measuring the similarity of an input image to a plurality of aesthetic styles may involve supervised and unsupervised machine learning techniques such as k-nearest neighbor clustering, k-means clustering, neural networks, and support vector machines. Similarity may be computed on the input image directly or in aesthetic feature space (i.e. after the input image has been converted to the aesthetic feature basis of a particular aesthetic style). A weight may be associated with each aesthetic style depending on this similarity measure which may be used to weight the image capture suggestions generated from each aesthetic style separately (i.e. a weighted average), $$S = \frac{\sum_{i=1}^{n} w_i s_i}{\sum_{i=1}^{n} w_i}$$

where $s_i$ is the image capture suggestion generated from the i-th aesthetic style, $w_i$ is a measure of how similar the input image is to the i-th aesthetic style, n is the number of aesthetic styles used by the system, and S is the composite image capture suggestion generated by the system. In some embodiments, only those aesthetic styles with a weight above a certain threshold are used to generate an image capture suggestion in order to conserve processing resources.

Reference is now made to FIG. 1, which illustrates an example environment 100 in which embodiments of the present invention may be utilized. An aesthetic learning system 110 generates a plurality of machine-learned data based on the aesthetic image set 130 it receives. The aesthetic image set 130 contain images whose common or statistically significant features define a target aesthetic for the system. These images may share similarities in subject, composition, color, or other artistic qualities. For example, several images from a series of close-up, shallow depth of field, profile portraits may be given as an aesthetic image set. The aesthetic image set may contain a plurality of exemplar images and variation images. Variation images in the aesthetic image set may be labelled to indicate which of one or more variations in image capture parameters from an exemplar of the aesthetic they represent (i.e. which "class" they are a member of, for example "camera shifted right", "low contrast", "camera pitch −30 degrees", or "camera shifted right, low keylight"). Image "labels" as referred to herein may be data attached to the images directly to identify their characteristics or they may exist as a mapping between images and characteristics stored in a database. In some embodiments the labels may correspond to single (e.g., binary encoded label) or multi-class classification (e.g., one-hot encoded label). In some embodiments the labels may indicate the degree of variation in the image capture parameters a particular variation image represents (i.e. regression labelled) such as on a floating point or integer scale (e.g., corresponding to "camera shifted right 3 meters" or "overexposed 2 stops"). In some embodiments there may be a combination of classification and degree of variation (i.e. regression) labels utilized.

In some embodiments variation images may be produced by capturing an image with a digital camera which would be an exemplar image except with one or more variations applied to the parameters of the camera, lighting, and/or subject. Some examples of variations in the image capture parameters may include "translated camera position down", "camera rotated 30 degrees", "subject translated left", or "keylight overexposed by 2 stops". The corresponding labels to identify the variation in image capture parameters the variation image represents may be applied to the variation image as it is incorporated into the aesthetic image set. In some embodiments (e.g., when the image capture device suggestion only comprises one image capture device parameter) the label may just indicate that the variation image is "non-exemplar" with no indication of specific image capture parameter which has been modified from an exemplar of the aesthetic.

In some embodiments variation images may be produced by altering previously captured exemplar and/or variation images digitally to produce "synthetic" variation images. Synthetic variation images contain alterations made to an image after it has been captured by a camera system to simulate the effect of a plurality of variations in image capture parameters. For example, in some embodiments exemplar images would be digitally shifted (e.g., via image processing software) positively and negatively along both the cardinal axes separately to automatically generate "camera left", "camera right", "camera up", and "camera down" variation images. As a further example, in some embodiments the exemplar and variation images may have a gamma function applied to them digitally to generate "camera overexposed" variation images. Synthesizing variation images may be a manual process (i.e. involving a human operator to produce) or be automated through software and/or hardware. The synthesized variation images may be labelled to identify the variation in image capture parameters each represents. In some embodiments the label may just indicate that the variation image is "non-exemplar" with no indication of specific image capture parameter which has been modified from an exemplar of the aesthetic.

The aesthetic learning system 110 analyzes the aesthetic image set to learn the defining features of an aesthetic and how to use them to distinguish between exemplar and non-exemplar images and a plurality of image capture parameter variations represented by the variation images. This is accomplished through the function of the basis extraction solver module 140 and the discriminator solver module 150 which form the aesthetic learning system 110. These modules are described in the following text.

The aesthetic image set 130 is received by the basis extraction solver module 140 which then derives a plurality of aesthetic features (i.e. features that are salient or statistically significant in describing these images) from the aesthetic image set. These features may be found by a plurality of pattern recognition techniques performed on the aesthetic image set 130 and form an aesthetic basis which may be used to describe any image presented to the system. The aesthetic basis may be used to describe an input image in terms of the specified aesthetic style. Features that may be part of an aesthetic basis may include contours, boundaries, activations of specific filter banks, wavelets, objects such as eyes and faces, and particular symmetries and arrangements of these features. Aesthetic features are characteristics that may be used to distinguish between exemplar images and variation images in the aesthetic image set as well as distinguish between images in the aesthetic image set and images not in the aesthetic image set (i.e. members of an aesthetic style and not).

Pattern recognition techniques utilized by the basis extraction solver module 140 may include supervised or unsupervised machine-learning algorithms such as neural net architectures (e.g., convolutional neural networks, auto-encoder networks, generalized adversarial networks, and fully-connected networks) and clustering algorithms (e.g., k-means clustering or hierarchical clustering). Pattern recognition techniques utilized may include various forms of image segmentation such as thresholding (e.g., maximum entropy and Otsu's method), region-growing, simulated annealing, and watershed transformations. Pattern recognition techniques utilized may include image processing techniques that find structure in images such as edge-detection, blob-detection, template matching, and Hough transforms. Pattern matching techniques may include change of basis transforms such as forms of Fourier Analysis, wavelet decomposition, and manifold learning (e.g., principal component analysis, locally linear embedding, and t-distributed stochastic neighbor embedding).

The learned aesthetic basis may consist of features derived through object detection techniques such as template matching, segmentation, watershed, convolutional neural networks, or flood-fill. These features may consist of a plurality of objects detected in an image along with their properties such as their size, contours, and orientation. Features may include the region of the image which contains a specific object. Features may include how well the actual image matches the defined object. Features may also be characterized with a measure of their importance to describing an image.

The learned aesthetic basis may consist of features derived through image processing techniques that find structure in images such as lines, contours, and localized patterns. These features may be derived through techniques such as convolutional filters and Hough Transforms. These features may include their location and extent. Features may include how well the detected structures match the actual patterns being matched as well as their strength.

The learned aesthetic basis may consist of features derived though "change of basis" techniques such as wavelet decomposition, filter banks, and manifold learning. These features may include correlation coefficients, orientation, and amplitude of specific filter shapes. These features may include feature maps for the image expressed in different latent spaces.

The basis extraction solver 140 learns the features that define a particular aesthetic style from analysis of the aesthetic image set whereas in conventional techniques these are largely "hard-coded" from predetermined algorithms and rules (e.g., finding eyes in a face and positioning them in the center of the image). In learning the aesthetic basis, through using supervised and unsupervised machine learning techniques to implement the pattern recognition techniques, the basis extraction solver 140 produces an inferred algorithm which can convert any image to the aesthetic basis. The aesthetic basis learned by the basis extraction solver 140 is specific to the aesthetic style defined through the aesthetic image set 130. Thus, two different aesthetic image sets may result in two distinct aesthetic bases that can be used to describe input images. For example, an aesthetic image set that consists of portraits will likely result in an aesthetic basis consisting of features related to aspects common in faces such as eyes, mouth, hair, and mirror symmetry along the vertical axis of a face. Similarly, an aesthetic basis derived from an aesthetic image set that consists of landscape images will likely contain features relating to the horizon line, plants, water, and proportion of sky to land. As the aesthetic basis may be determined completely from the aesthetic image set, there is no requirement for any predetermined features or rules to be defined in order to embody the invention discussed herein.

The images comprising the aesthetic image set are each converted into the aesthetic basis by the basis extractor solver 140 (said converted image set herein referred to as the "converted aesthetic set"). The converted aesthetic set 145 is received by the discriminator solver module 150 which includes data identifying the variation in image capture parameters that each image may represent. Within the discriminator solver module 150 the converted aesthetic set images 145 are analyzed (e.g., via a supervised machine learning technique) to train an algorithm that can differentiate images with different variation content based on the aesthetic features they possess (i.e. "classify" an image). This algorithm is referred to as the "discriminator" herein. In some embodiments the differentiation may be between exemplar and a plurality of variation images (i.e. differentiate 'exemplar', 'camera shifted right', and 'camera overexposed' images). In some embodiments the differentiation may be purely between exemplar and non-exemplar images (i.e differentiate 'good' and 'bad' images). Some embodiments may include both types of differentiation.

The discriminator may be trained to perform a single or multi-class classification on an image, such as possessing a plurality of variations (i.e. image is "camera shifted right and underexposed"). The discriminator may be trained to perform a form of regression where the degree of variation possessed is also estimated (i.e. image is "camera shifted 2 meters right"). The discriminator may perform a combination of purely classification and regression differentiations.

The discriminator solver 150 may use supervised learning techniques which analyzes the converted aesthetic set images and their labels and produces an inferred function (i.e. discriminator) which can classify "unseen" images. The techniques utilized may include linear or logistic regression, decision trees, support vector machines, k-nearest neighbor, and neural networks. The discriminator may utilize a loss function as part of a learning model. The loss function specifies how the training process penalizes the deviation between the inferred classifications made by the discriminator and the true variation labels of each image (i.e. "ground truth"). The choice of loss function depends on the desired output of the discriminator. Cross-entropy may be used as a loss function when the discriminator is differentiating a plurality of independent classes of variations (e.g., "camera translated right" or "exemplar"). Mean squared error (MSE) may be used when the discriminator regresses to real-valued (i.e. degree of variation) labels (e.g., "camera translated two meters right" or "camera translated four meters right").

Depending on the loss function utilized by the discriminator solver module 150, the differentiation produced by the trained discriminator may be a simple classification (i.e. binary or multi class classification) or given as a degree of variation on a discrete or continuous scale (i.e. an integer 1 to 10 or any floating point number in the range 0 to 1). The discriminator may be trained to determine the degree of certainty (i.e. probability) of the differentiation either overall or for each variation detected (this certainty measure is inherent to many supervised learning techniques and may correspond to relative distance in aesthetic feature space from the converted input image to a specific variation character such as "camera shifted left"). The choice of loss function to use may affect the accuracy of the model and is likely to be influenced by the available data within the aesthetic image set 130. The choice of loss function may simply be determined by trial and error (i.e. which loss function results in more accurate discrimination). The choice of loss function may be influenced by the type of data available in aesthetic image set. For example, if the variation images are labelled with the degree of variation in image capture parameters they represent (e.g., "camera shifted two meters right") then a loss function appropriate for regression to a real-valued labels such as MSE may be used.

Once trained, the discriminator may detect what plurality of variation characteristics are present in an input image converted to the aesthetic basis which is presented to it. For example, an exemplar image converted to the aesthetic basis can be differentiated from a different image converted to the aesthetic basis that contains a plurality of variation characteristics such as "camera translated right", "key light low", and "camera zoom". The discriminator may return a measure of distance in the latent space of aesthetic features (i.e. the aesthetic basis) between an input image and exemplar and variation characteristics of the aesthetic image set. The discriminator may determine the variation characteristics of the input image based on this distance measure (i.e. the closest variation may be chosen or a statistical average of the nearest variations as in a technique such as k-nearest neighbor clustering).

In some embodiments the training of the discriminator via the discriminator solver module 150 may inform the basis extraction solver 140. This communication may occur once or in an iterative manner. The basis extraction solver 140 may then update the training of the aesthetic basis converter function so as to minimize error in the discriminator function trained by module 150. This may be done so the features extracted by the basis extraction solver 140 are the ones best able to inform the discriminator solver, thereby reducing error in the trained discriminator function. The discriminator solver 150 may then train a new discriminator and the process may be repeated until the error between inferred classification of the discriminator function and ground truth either converges or is below some threshold.

As part of the learning the aesthetic basis, the basis extraction solver 140 "trains" an algorithm to convert an image to the aesthetic basis, referred to as "aesthetic basis converter" 142 herein. The algorithm, for example, may include specific filters, templates, detected shapes, and neural net node weights. This algorithm may subsequently be used to convert an input image to the aesthetic basis within the suggestions generator system 120. Once the training is complete the aesthetic basis converter algorithm 142 may be stored and accessed by the aesthetic basis converter module 170 for subsequent use. In some embodiments the trained aesthetic basis converter algorithm 142 may reside on the same machine as the suggestion generator system 120, in other embodiments said algorithm may be transferred to a different machine via a network (e.g., Internet, wide-area network, local-area network) or using a tangible machine-readable storage device (e.g., CD-ROM).

As part of the learning process the discriminator solver module 150 "trains" the discriminator algorithm 152. The discriminator 152 may be used to take an input image converted to the aesthetic basis (i.e. described by the features found in the aesthetic basis) and determine which variation characteristics may be present in whole or in part. In some embodiments the proportion of each variation quality present in an input image may also be determined (i.e. perform a "regression" analysis). Once the training is complete, the trained discriminator 152 may be stored and accessed by the discriminator module 180 for subsequent use. The algorithm may comprise specific filters, templates, logic, and neural net node weights. In some embodiments the trained discriminator algorithm 152 may reside on the same machine as the suggestion generator system 120, in other embodiments said algorithm may be transferred to a different machine via a network (i.e. Internet, wide-area network, local-area network) or using a tangible machine-readable storage device (i.e. CD-ROM).

Turning away from the learning portion of the environment we now examine the system that generates the image capture suggestions for a received input image, referred to herein as the "suggestion generator system" 120. The suggestion generation system 120 receives an input image 160 and outputs the image capture suggestion 192. This suggestion is based on the aesthetic style learned from the aesthetic image set 130 in the aesthetic learning system 110. The suggestion generation system 120 consists of the aesthetic basis converter module 170, a discriminator module 180, and suggestion logic module 190. In some embodiments the learning system 110 may be invoked immediately before the generator system 120. In some embodiments the learning system 110 may be invoked to train aesthetic basis converter 142 and discriminator 152 algorithms a significant amount of time before the suggestion generator system 120 utilizes them to generate an image capture suggestion 192.

The aesthetic basis converter module 170 is the initial stage of the suggestion generator system 120. It receives an input image 160 and converts it to the aesthetic basis (i.e. describes the input image in terms of aesthetic features) using the trained aesthetic basis converter algorithm 142. The input image converted to the aesthetic basis is referred to as "converted input image" 172 herein. In some embodiments the input image 160 may be delivered by a real-time camera system where the analysis may occur immediately. In some embodiments the input image may have been stored on a digital non-transient memory device and analyzed a significant time after it was captured. In some embodiments the input image 160 may be captured by a camera operated by a person. In some embodiments it may be captured by a camera which is part of an autonomous platform such as a drone or motorized mount system.

A continuous stream of images may be received by the suggestion generator system 120 and the method may then be applied for each of the images or for some subset of the images provided (i.e. the stream of images may be sampled). Once an analysis of an input image according to the disclosed methods is complete (i.e. an image capture suggestion is generated), the stream of images may be sampled again.

Once the input image is received by the aesthetic basis converter module 170 it is converted to the aesthetic basis utilizing the aesthetic basis converter algorithm 142 trained by the basis extraction solver 140. In some embodiments the basis extraction solver 140 trains a neural net model as the aesthetic basis converter. In these embodiments, once the neural net is trained (i.e. node weights are adjusted until some stopping criteria is satisfied) the node weights are simple referenced, and not updated in the aesthetic basis converter module 170 (i.e. no "learning" is performed as the input image is simply passed through the "static" neural network). In some embodiments, image processing filters are trained by the basis extraction solver 140 (i.e. filter coefficient weights are determined) as part of the aesthetic basis converter algorithm. In these embodiments, the same filter banks (with the same filter coefficient weights) would then be applied to the input image in the aesthetic basis converter module 170.

The converted input image 172 is next presented to the discriminator module 180. The discriminator module 180 may determine which plurality of variations in image capture parameters 182 (i.e. variation characteristics) the converted input image may represent in whole or part. The discriminator module 180 utilizes the discriminator algorithm 152 trained by the discriminator solver module 150. In some embodiments the discriminator module 180 may determine the variation characteristics 182 of the input image by classification (i.e. binary or multi class classification). In some embodiments the discriminator module 180 may determine the variation characteristics of the input image as a degree of variation on a discrete or continuous scale (i.e. an integer 1 to 10 or any floating point number in the range 0 to 1). In some embodiments the degree of certainty in the inferred classification may be determined either overall or for each variation characteristic detected in the input image.

The variation characteristics 182 detected in the input image by the discriminator module 180 are sent to the suggestion logic module 190. The suggestion logic module 190 generates the image capture suggestions 192 based on the variation characteristics detected in the input image. This may be accomplished via a logic function implemented in software and/or hardware. In some embodiments, the inverse of the detected variations are used as the scene capture suggestions. For example, if the input image is found to be similar to variation images with "camera translated right" character (i.e. having "camera translated right" variation character) then the image capture suggestion would be to "move the camera to the left". In some embodiments only the variation detected in the highest certainty would be used to generate a suggestion. In some embodiments the possible variations contained in the input image are ranked in importance and the suggestions are made according to this ranking (i.e. generate an image capture suggestion corresponding to most important variation first).

In some embodiments the image capture suggestion may be a weighted average of all the variations detected, with the weights determined by the degree of certainty that each variation characteristic is contained within the image as determined by the discriminator.

In some embodiments the image capture suggestions 192 may be used to control one or more corresponding parameters of an automated camera platform. The automated camera platform may be a robotic drone, motion control camera, or handheld camera. In some embodiments these suggestions may be delivered to an automated lighting platform and be used to control individual light intensity, color, and timing. In some embodiments these suggestions may be delivered to a GUI or display system such as a light emitting display (LED) to guide a human camera operator. In some embodiments these suggestions may be delivered to a GUI or other display system to guide the position of the subject of an image capture (i.e. for a portrait or "selfie" image capture). In some embodiments the image capture suggestions are stored on a tangible machine-readable storage device for reference or use some time in the future In the environment of the invention 100 discussed above, the aesthetic basis converter 170, discriminator 180, and suggestion logic 190 modules may be instantiated to produce the image capture suggestions 192 for all the potential image capture parameters in a unified manner. In some embodiments said modules may be instantiated as separate algorithms for each image capture parameter or a subset of image capture parameters (i.e. a set of algorithms are trained for each image capture parameter separately such as an algorithm for "camera translation right" or "keylight underexposed"). This decision may be informed by a tradeoff between accuracy and operational efficiency. For example, a system instantiated for each single image capture parameter may be more accurate in determining variation characteristics of an input image but the corresponding system may require additional memory and additional mathematical operations (i.e. become slower) to operate.

In some embodiments one or more aesthetic styles are provided for a user (i.e. human operator or an automated system) of the system to utilize. In some embodiments the plurality of aesthetic styles may be provided to a user as a plurality of aesthetic image sets. In some embodiments the plurality of aesthetic styles may be provided to a user as a set of trained aesthetic basis converter and discriminator algorithms.

Figure 2:
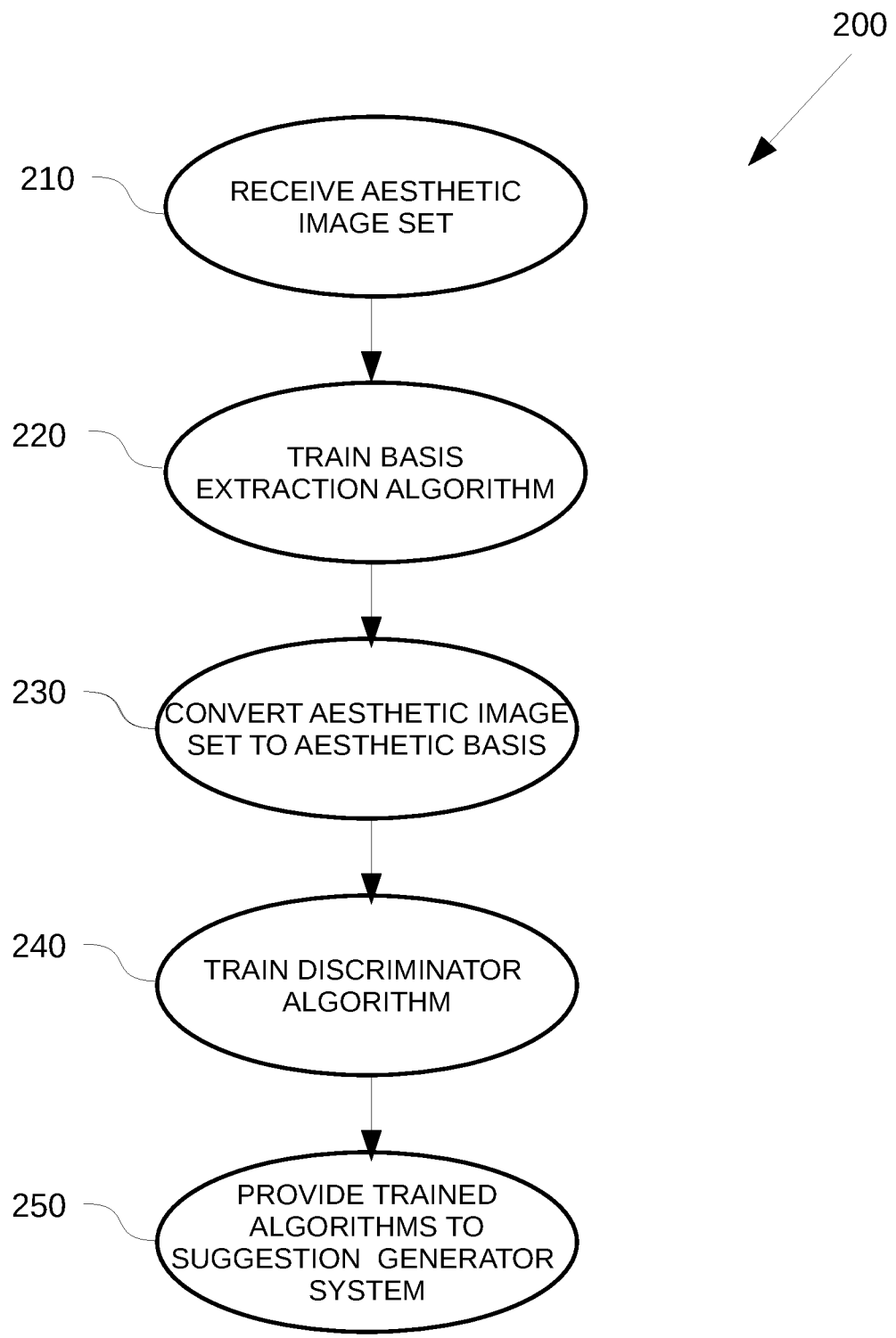
FIG. 2 is a flow diagram of an example high-level method for performing aesthetic learning.

Reference is now made to FIG. 2, a flowchart of an exemplary high-level method 200 for performing aesthetic learning is shown. The operations of the method 200 may be performed once or many times by the aesthetic learning system 110. In step 210 the aesthetic image set defining an aesthetic style is received. For example, the aesthetic image set may comprise a thousand images of a particular portrait style corresponding to both exemplars of the aesthetic as well as variation images labelled with the plurality of variations in image capture parameters each represents. For example, the aesthetic image set may comprise 400 exemplar images, 200 variation images corresponding to "overexposed" camera settings, 200 variation images corresponding to "underexposed" camera settings, and 200 variation images corresponding to "underexposed and shifted left" camera settings.

In step 220 the aesthetic image set is analyzed to determine a plurality of aesthetic features via one or more pattern recognition techniques by the basis extraction solver module 140. This analysis "trains" the aesthetic basis converter algorithm through a plurality of machine learning techniques. In some embodiments the basis extraction solver module 140 may train a neural network to extract these features. In some embodiments the basis extraction solver module 140 may learn the coefficients of a plurality of filter banks. In some embodiments the basis extraction solver module 140 may learn the position and correlation coefficients of templates that have been convolved with the aesthetic image set. The aesthetic basis converter algorithm may be subsequently utilized to convert an image presented to the system to the aesthetic basis. The aesthetic basis converter algorithm may be used immediately upon training or stored for use at a later time.

In step 230 the aesthetic image set is converted to the aesthetic basis by the basis extraction solver module 140 via the trained aesthetic basis converter algorithm. In some embodiments the converted aesthetic images may be produced as a plurality of feature maps. In some embodiments the converted aesthetic images may be generated as correlation coefficients of a plurality of templates. The converted aesthetic image set is delivered to the discriminator solver module 150.

In step 240 the converted aesthetic image set is analyzed by the discriminator solver module 150 to learn the discriminator algorithm that may differentiate between exemplar, non-exemplar, and a plurality of variation images based on the aesthetic features contained in each. This analysis "trains" the discriminator algorithm through a plurality of supervised and unsupervised machine learning techniques. After training, the discriminator algorithm may be utilized to determine how similar the aesthetic features of an image presented to the system are to the aesthetic features typically (i.e. statistically) possessed by exemplar or a plurality of variation images (i.e. which exemplar or variation characteristics an image possesses). The discriminator algorithm may be used immediately or stored for use at a later time.

Once the training of the aesthetic basis converter and discriminator is completed by the aesthetic learning system 110, the trained algorithms are provided to the suggestion generator system 120 in step 250. In some embodiments where systems 110 and 120 do not exist on the same machine, the aesthetic learning system 110 may transmit the trained algorithms to a different machine via a network (i.e. internet, wide-area network, local-area network) or using a tangible machine-readable storage device (i.e. CD-ROM).

Figure 3:
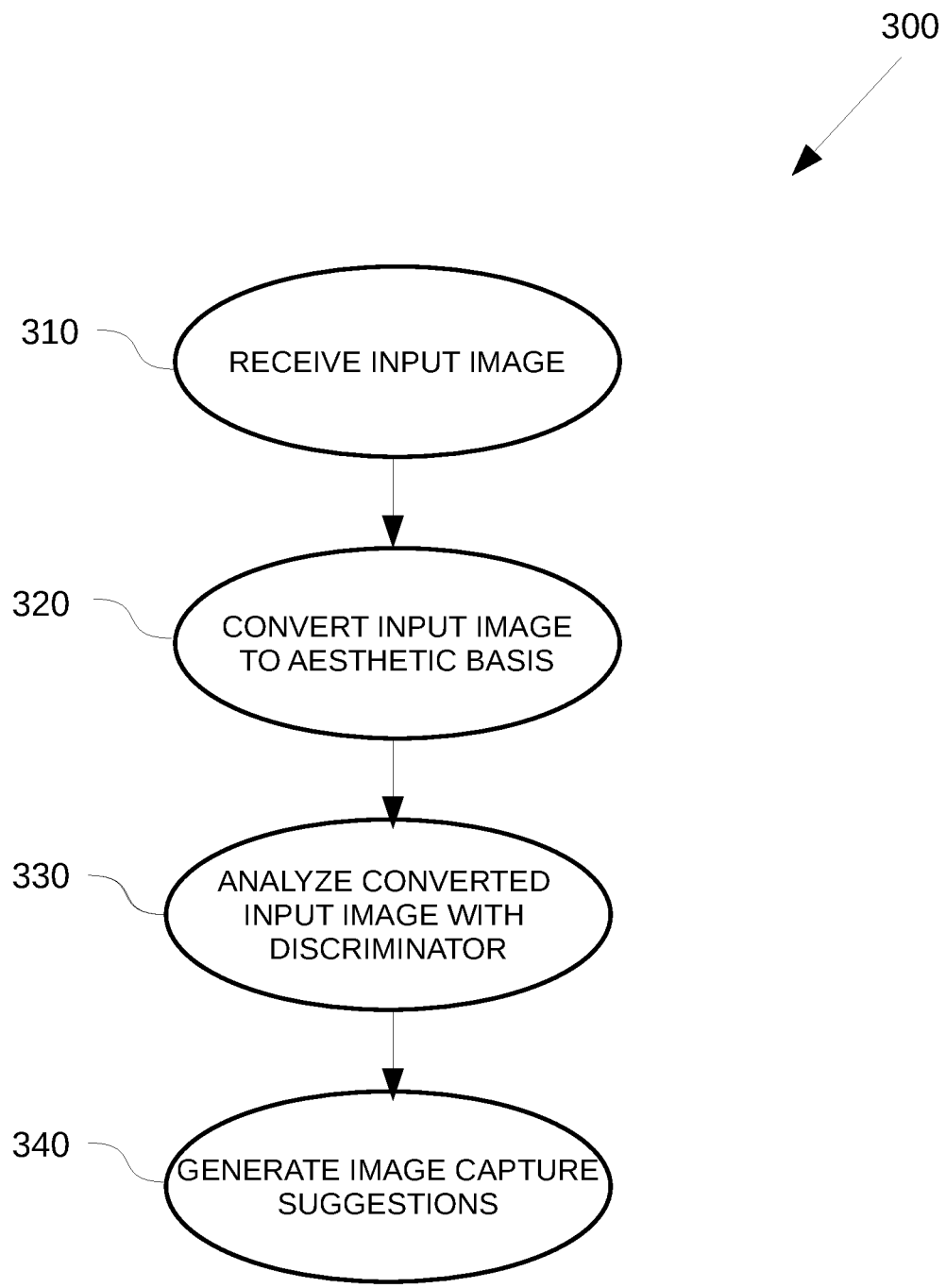
FIG. 3 is a flow diagram of an example high-level method for generating image capture suggestions.

Reference is now made to FIG. 3, which shows a flowchart of an exemplary high-level method 300 for generating image capture suggestions from one or more input images. The operations of the method 300 may be performed once or many times by the suggestion generator system 120. In step 310 an input image is received by the system. The input image may be directly from a camera coupled to the suggestion generator system 120 or may be read from a tangible machine-readable storage device.

In step 320 the input image is converted into the aesthetic basis by the aesthetic basis converter module 170. In example embodiments, the input image is thus described in terms of possessing a plurality of aesthetic features learned as being salient to describe the aesthetic image set. The aesthetic basis converter module 170 utilizes the aesthetic basis converter algorithm trained on the aesthetic image set in step 220 described previously. The aesthetic basis converter algorithm may utilize trained neural net models, filter banks, and object recognition techniques among others. In some embodiments, the aesthetic basis converter may utilize a convolutional neural net machine-learning model which receives the input image and outputs an array of feature maps corresponding to convolutions of the input image with a plurality of learned filters.

In step 330 the converted input image is analyzed by the discriminator module 180 to determine which plurality of exemplar and variation characteristics which may be present. In example embodiments, the discriminator module 180 compares the similarities and differences between the converted input image aesthetic features and those aesthetic features that are characteristic of exemplar and variation images. In some embodiments this may involve a distance measure between the input image and exemplar and variation images in the aesthetic feature space (e.g., a k-nearest neighbor clustering model). In some embodiments the discriminator may utilize a trained supervised machine learning classifier (e.g., support vector machine or neural network). The discriminator module 180 utilizes the discriminator algorithm learned in step 240 described previously. Once the similarity of the converted input image aesthetic features to variation and exemplar aesthetic features is determined, the input image is thus described as possessing a plurality of variation and exemplar characteristics.

In step 340 the exemplar and variation characteristics determined to be possessed by the input image are used to generate image capture suggestion by the suggestion logic module 190. In some embodiments, the image capture settings suggestion may be produced as a the inverse of the identified variation characteristics (i.e. if the input image shares many features with a "camera right-shifted" variation then the image capture suggestion may be "camera should be shifted to the left"). The image capture suggestion may include none, one or a plurality of image capture parameter suggestions. For example, an image capture suggestion may be 'move the subject to the right' or 'increase key light illumination and move the camera closer to the subject'. The image capture suggestion may include no image capture parameters at all if the input image contains significantly more exemplar than variation characteristics (i.e. no adjustments need to be made to the image capture device parameters as the input image is very similar to an exemplar of the aesthetic style).

The term "user", as referred to herein, may relate to a human, an automatic camera (i.e. a camera which may automatically change its location and/or some other camera characteristic such as exposure), a robotic platform carrying a camera, an automated lighting system utilizing the invention or to software. In some embodiments the user of the suggestion generation system, before performing steps 310-340, may have also performed steps 210-240 described above by providing the aesthetic learning system 110 with an aesthetic image set. In some embodiments the user of the suggestion generation system may not perform any of the training steps 210-240 and the suggestion generation system may utilize an aesthetic basis converter and discriminator that have been trained beforehand (either by the user of the suggestion generation system or by a different user) and stored on a non-transient machine-readable storage medium.

Figure 4:
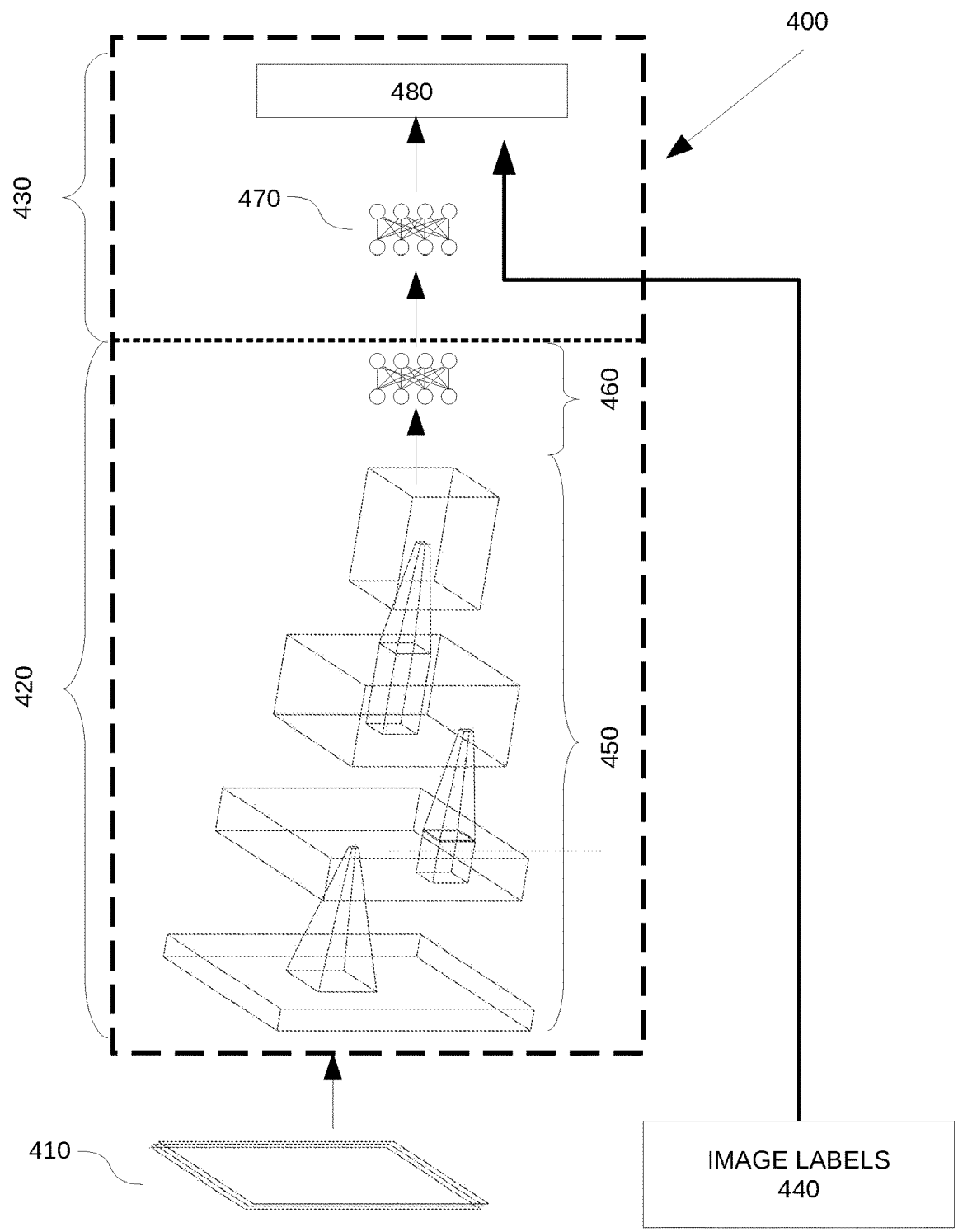
FIG. 4 illustrates a diagram of a possible embodiment of the aesthetic learning system as a supervised machine learning model, specifically a convolutional neural network.

FIG. 4 illustrates a possible embodiment of the aesthetic learning system 110 utilizing a supervised machine learning model 400. This embodiment instantiates the basis extraction solver module 140 as a neural net architecture 420 which is trained to extract the aesthetic basis from the aesthetic image set 410 (i.e. trains the aesthetic basis converter algorithm).

The discriminator solver module 150 is similarly embodied here as a neural net 430. In this embodiment 400 both the basis extraction solver 420 and discriminator solver 430 modules are instantiated as a single connected neural network with a single loss layer 480 though other embodiments may use separate neural networks with their own loss layers.

A machine learning model refers to an algorithm that can be trained to perform a task based on input data and not by being given task-specific rules. A "neural network" is a machine learning model consisting of neurons (or nodes) which are interconnected with each other. Each neuron receives a signal, processes it according to an activation function, and can transmit this processed signal to other connected neurons. Possible architectures consisting of neural nets may include fully connected networks, auto encoding networks, convolutional networks, recurrent networks and various combinations of these networks and others. Convolutional neural networks (i.e. "CNNs") are used for the embodiment of the basis extraction solver module 420 as they are well-suited for extracting features from images. They are designed to take advantage of the local spatial correlation inherent in most images. CNNs describe an image in terms of a set of learned spatially-localized patterns or filters.

The CNN 420 consists of a plurality of convolution layers 450 and fully-connected layers 460 which work together to process the image. The nature of the convolution operation naturally leads to a description of the aesthetic image set as a plurality of learned spatially localized patterns and their arrangement which correspond to aesthetic features. The convolutional layers 450 take advantage of the high degree of spatial correlation present in most images to make feature determination computations tractable. In some embodiments these layers 450 may include pooling and/or deconvolution layers to aid in developing a hierarchy of features. Activation functions for the neurons may be rectified linear activation (i.e. ReLU) though others such as sigmoid and tanh may also be employed.

In some embodiments, the convolution and fully-connected layers resemble neural networks described in "ImageNet Classification with Deep Convolutional Neural Networks" by A. Kirzhevsky, I. Sutskever, and G. E. Hinton in Advances in Neural Information Processing Systems 25, 2012 at pages 1097-1105, which is incorporated by reference herein.

The convolution layers 450 are learnable filters that are trained to analyze, identify, and respond to features specific to the input images. The convolution layers 450 are combined via pooling and fully-connected 460 layers to mimic the processing in the human visual system to aid in learning a hierarchy of features from the input images. Initial layers in the CNN 420 may find low level details such as edges and gradients and these are combined in later layers to represent high-level features which may include recognizable objects or parts of them as features such as faces, eyes, or tires and the like.

Aesthetic features are extracted in the basis extraction solver CNN 420, and are then received by the discriminator solver 430. The discriminator solver 430 is embodied here as a combination of fully-connected layers 470 and a loss layer 480. The discriminator solver 430 learns a function (discriminator) which maps aesthetic features to exemplar and variation characteristics which may be present in each image in the aesthetic image set. The discriminator function is embodied as a plurality of fully-connected layers 470, though other realizations are possible. The final layer is a loss layer 480 which specifies how training penalizes the deviation between the given exemplar and variation labels on the images in the aesthetic image set 440 (i.e. machine learning "ground truth"), and what the discriminator network 470 infers to them to be.

In the embodiment depicted in FIG. 4, training consists of presenting the aesthetic image set labelled with any variation in image capture parameter variations the individual images represent to the neural network 400. Said labels 440 are the ground truth for the neural net training. The network then learns how to differentiate between the differently labelled images in the aesthetic training set. Learning is the process by which the neural network 400 adapts to make more accurate predictions. Learning involves adjusting the network 400 to minimize the difference between the network inference and ground truth 440 as determined within the loss layer 480 via a "cost" function. There are many choices of cost functions to be used, often the choice depends on the types of classification or regression that is to be performed by the trained discriminator. An embodiment which classifies an image into one of many variation classes may include cross-entropy error as a cost function, $$\text{Error} = -\sum_{c=1}^{M} y_c \log(p_c)$$

where M is the number of classes, $y_c$ is a binary indicator (i.e. 0 or 1) if class label c is the correct classification, and $p_c$ is the predicted probability of being of class c. Learning attempts to reduce the total of the error across all the training set and can be viewed as an application of optimization theory. In some embodiments this is an iterative method in which training images are presented to the system, the error is calculated, the network is adapted (i.e. node weights are adjusted) to minimize the error (i.e. the cost function) determined in the loss layer 480. The process may repeat until the network adaptation does not meaningfully reduce the error.

In this embodiment 400, network adaptation may be a form of backpropagation. Backpropagation is a technique where the node weights may be adjusted for each cost function evaluation performed. Portions of the error are assigned to each individual node in the neural network, which involves a calculating the gradient of the cost function with respect to the weights of each node. The network weighs are then updated and the process iterates towards a network optimized to minimizing the cost function of 480. Gradient descent may be utilized to optimize the backpropagation process.

As stated above, in this embodiment 400 both the basis extraction solver 420 and discriminator solver 430 modules train the aesthetic basis converter and discriminator algorithms jointly with a single loss layer 480. This may improve the accuracy of the algorithms trained by the network 400 as the aesthetic basis has many potential degrees of freedom (i.e. there may be many choices of an efficient aesthetic basis) and in jointly training both aesthetic basis converter and discriminator algorithms, the aesthetic basis may be determined in a way that increases the accuracy of the discriminator algorithm. Through joint training the aesthetic features learned may be more likely to be the ones most valuable to generate an accurate discriminator algorithm.

Other embodiments may train neural networks for the basis extraction solver 420 and discriminator solver 430 modules separately. This may be because joint training may not be possible or for reasons of computational economy or for improved accuracy. If trained separately, the aesthetic basis solver may utilize supervised learning techniques where the ground truth may comprise the images in the aesthetic image set themselves (i.e. as in a neural network autoencoder).

Figure 5:
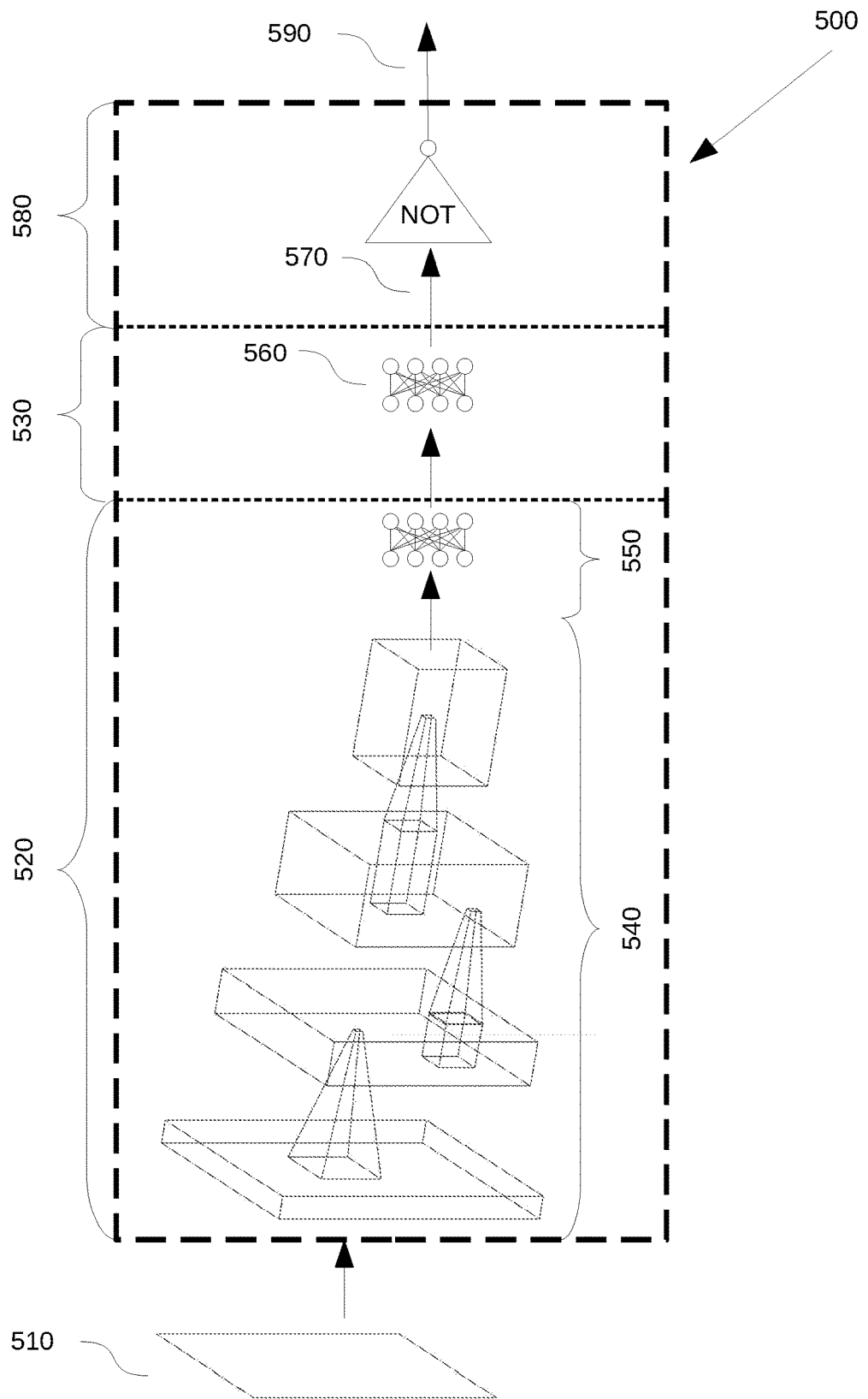
FIG. 5 illustrates a diagram of a possible embodiment of the suggestion generator system utilizing a supervised machine learning model, specifically a convolutional neural network.

Once the aesthetic learning system instantiated as a neural net 400 has trained the aesthetic basis converter and discriminator algorithms these may be utilized by the suggestion generator system 120 to analyze an input image to determine if it contains exemplar and/or variation characteristics. FIG. 5 illustrates an example embodiment of the suggestion generator system 500 that may be used with the aesthetic learning system embodied in 400. The embodiment 500 consists of an aesthetic basis converter module 520 that utilizes the aesthetic basis converter algorithm trained in the basis extraction solver module 420 using a neural network. There is no further training performed (i.e. the weights of the nodes of the neural net are set by the training in the basis extraction solver module 420 and do not adjust to the input image). The embodiment 500 also contains a discriminator module 530 that similarly utilizes the discriminator algorithm trained in the discriminator solver 430 using a neural network. Similarly, there is no further training performed on the discriminator algorithm (i.e. the weights of the nodes of the neural net are set by the training in the discriminator solver module 430 and do not adjust to the input image). Thus, the discriminator algorithm has the same neural network architecture of the discriminator solver module 430 except there is no loss layer as there is no training performed in the discriminator module 530.

The input image 510 is presented to the aesthetic basis converter module 520, the output of which is then presented to the discriminator module 530. The output of the discriminator module is any detected variation characteristics 570 in the input image. The detected variation characteristics are then use by the suggestion logic 580 to produce the image capture suggestion 590. In this embodiment the suggestion logic 580 is a logical NOT function which returns the negative of the detected variation character input 570. In other embodiments the suggestion logic may be a weighted average or a maximum function (or other mathematical function) depending on the desired automated system behavior.

Figure 6:
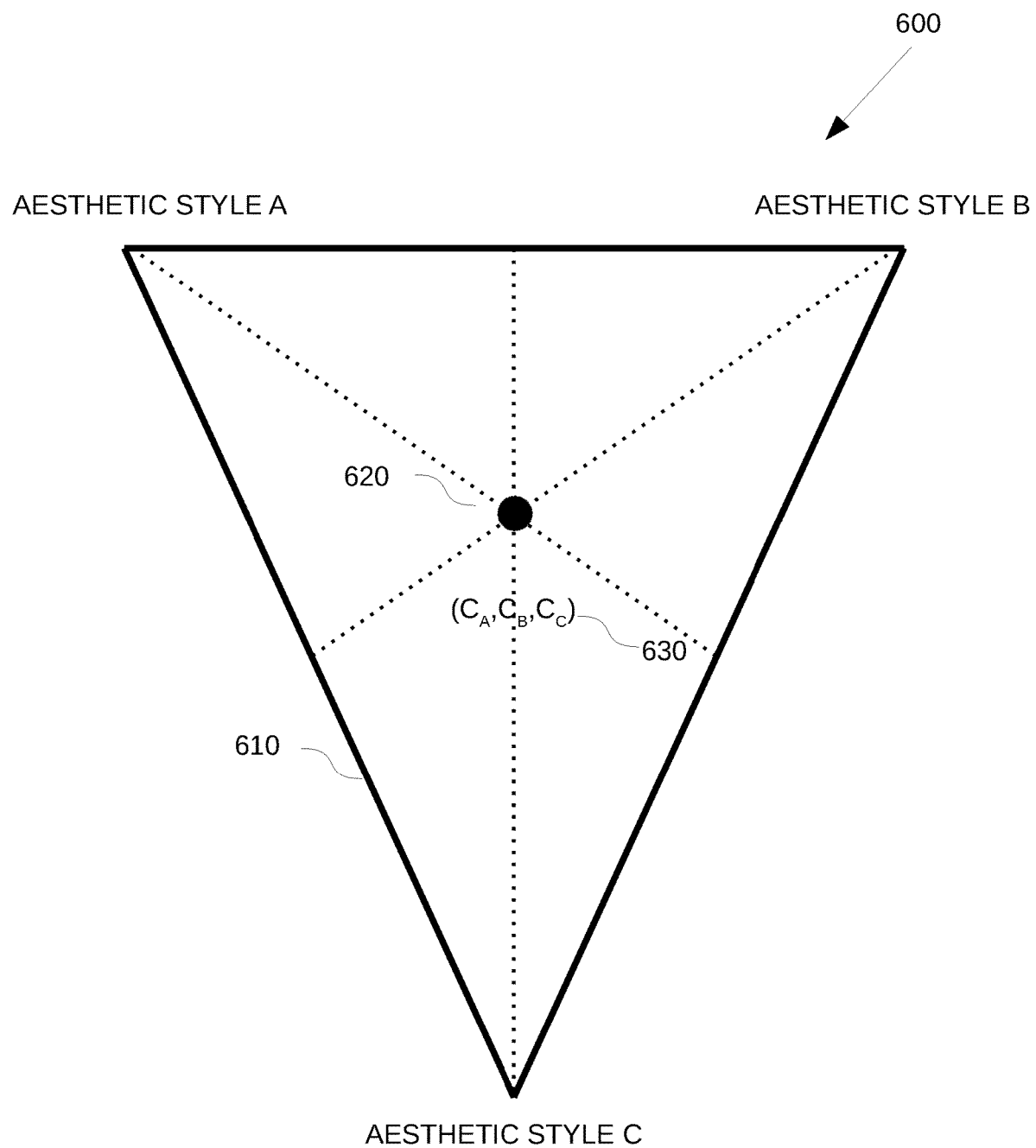
FIG. 6 is a diagram of an example human user directed means to select the weights of three aesthetic styles to be used to generate an overall image capture suggestion.

In some embodiments the image capture suggestion can be generated from a plurality of aesthetic styles, for example as an interpolation between close-up and long-shot portrait aesthetic styles. FIG. 6 illustrates an example of a human user directed means 600 to select the weights of three aesthetic styles to be used to generate the overall image capture suggestion. In this example, the final image capture suggestion delivered by the invention may be a weighted average of the three image capture suggestions arising from the three individual styles separately. In this example 600, the three aesthetic styles (A, B, C) are visualized in a coordinate system where each lies at a different vertex of a triangle 610. The user would select a position 620 within the triangular region bounded by the vertices and barycentric coordinates ($C_A$, $C_B$, $C_C$) 630 are used to specify the weight of each aesthetic style. Image capture suggestions are generated for each of the three aesthetic styles according to the methods and practices discussed herein. As an additional step, each image capture suggestion is then weighted according to the barycentric coordinates specified by the user of the system and then the weighted suggestions are all summed together (i.e. a weighted average of the image capture suggestions of all three aesthetic styles is used). This is only one of many possible ways to combine multiple aesthetic styles to generate an image capture suggestion, in other embodiments a different mathematical function such as a maximum or minimum logical function may be used.

It is also envisioned that a plurality of aesthetic styles may be utilized by the invention and one or more could be automatically weighted (i.e. weighted by an algorithm rather than a human user) based on how similar each aesthetic style is to an input image. This may involve an additional step in the method described in 300 where the weights of each aesthetic style are determined immediately after the input image is converted to the aesthetic basis (step 320) and sent to the suggestion generation system. These weights may be determined from a supervised machine learning model (e.g., a support vector machine or neural network) or unsupervised machine learning model such as k-nearest neighbor or k-means clustering.

Figure 7:
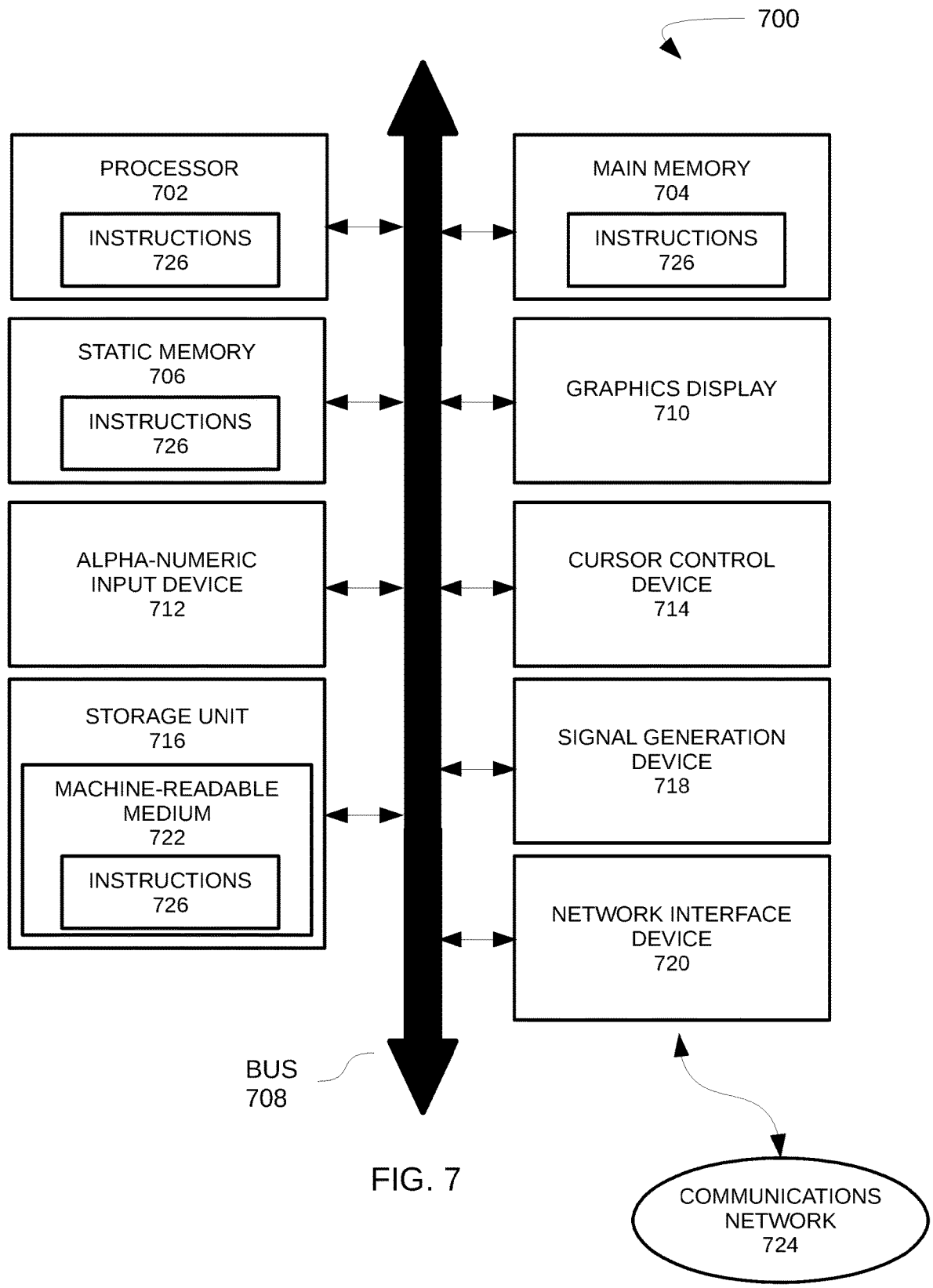
FIG. 7 is a simplified block diagram illustrating components of a machine which, according to some example embodiments, is able to read instructions from a machine-readable medium and perform any one or more of the methodologies discussed herein.

FIG. 7 is a block diagram illustrating components of a machine 700, according to some example embodiments, able to read instructions from a machine-readable medium and perform any one or more of the methodologies discussed herein. Specifically, FIG. 7 shows a diagrammatic representation of the machine 700 in the example form of a computer system and within which instructions 726 (e.g., software, a program, an application, an applet, an app, or other executable code) for causing the machine 700 to perform any one for more of the methodologies discussed herein may be executed. In some environments, the machine 700 may be implemented as part of the logic of a digital camera. In some environments, the machine 700 may be implemented as part of an automated camera platform such as a drone or motorized camera system. In some environments, the machine 700 may be implemented as the control system of an automated lighting system. In alternate environments, the machine 700 operates as a standalone device or may be connected (e.g., networked) to other machines. In a networked deployment, the machine 700 may operate in the capacity of a server machine or a client machine in the server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 726, sequentially or otherwise, that specify actions to be taken by that machine. Further, while only a single machine is illustrated, the term "machine" shall also be taken to include a collection of machines that individually or jointly execute instructions 726 to perform any on for more of the methodologies discussed herein.

The machine 700 includes a processor 702 (e.g., a central processing unit, a graphics processing unit, a digital signal processor, an application specific integrated circuit (ASIC), a radio-frequency integrated circuit, or any suitable combination thereof), a main memory 704, and a static memory 706, which are configured to communicate with each other via a bus 708. The machine 700 may further include a graphics display 710 (e.g., a light emitting diode display, a liquid crystal display, a projector, or a cathode ray tube). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a tangible machine-readable medium 722 on which is stored the instructions 726 embodying any one or more of the methodologies or functions described herein. The instructions 726 may also reside, completely or partially, within the static memory 706. The instructions 726 may also reside, completely or partially, within the main memory 704 within the processor 702 (e.g., within the processor's cache memory), or both, during execution thereof by the machine 700. Accordingly, the main memory 704 and the processor 702 may be considered as machine-readable media. The instructions 726 may be transmitted or received over a network 724 via the network interface device 720.

As used herein, the term "memory" refers to a tangible machine-readable medium able to store data temporarily or permanently and may be taken to include, but not limited to, random-access memory, read-only memory, buffer memory, flash memory, and cache memory. While the tangible machine-readable medium 722 is shown in an example embodiment to be a single medium, the term "tangible machine-readable medium" should be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "tangible machine-readable medium" may refer to a single storage apparatus or device, as well as "cloud-based" storage systems or storage networks that include multiple storage apparatus or devices. The term "tangible machine-readable medium" shall accordingly be taken to include, but not limited to, one or more data repositories in the form of a solid-state memory, an optical medium, a magnetic medium, or any suitable combination thereof. Furthermore, the tangible machine-readable medium is non-transitory in that is does not embody a propagating signal. However, labeling the tangible machine-readable medium as "non-transitory" should not be construed to mean the medium is incapable of movement—the medium should be considered as being transportable from one physical location to another. Additionally, since the machine-readable medium is tangible, the medium may be considered to be a machine-readable device.

The instructions 726 may further be transmitted or received over a communications network 724 using a transmission medium via the network interface device 720 and utilizing any one of a number of well-known transfer protocols (e.g., HTTP). Examples of communication networks include a local area network, a wide area network, the internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (i.e. code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or group of processors) may be configured by software as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (i.e. configured by software) may be driven by cost and time considerations.

Accordingly, the phrase "hardware module" should be understood to encompass a tangible entity, be that an entity that is physically constructed, permanently configured (i.e. hardwired), or temporarily configured (i.e. programmed) to operate in a certain manner or to perform certain operations described herein. As used herein, "hardware-implemented module" refers to a hardware module. Considering embodiments in which hardware modules are temporarily configured (i.e. programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (i.e. comprising different hardware modules) at different times. Software may accordingly configure a processor, for example, to constitute a particular hardware module at one instance of time and to constitute a different hardware modules at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (i.e. over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices (e.g., digital cameras and/or lighting controls), and can operate on a resource (i.e. a collection of information).

The various operations of example methods described herein may be performed, at least partly, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by on for more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the internet) and via one or more appropriate interfaces (e.g., an application program interface).

The performance of certain operations may be distributed among the one or more processors, not only residing within a single machine, but deployed across a number of machines. In some example embodiments, the one or more processors or processor-implemented modules may be located in a single geographical location (e.g., within a home environment, an office environment, or a server farm). In other example embodiments, the one or more processors or processor-implemented modules may be distributed across a number of geographical locations.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The present invention may be embodied in other specific forms without departing from its spirit or essential characteristics. The described embodiments are to be considered in all respects only as illustrative and not restrictive. For example, the methods described herein may be performed with less or more steps or the steps may be performed in differing orders. Additionally, the steps described herein may be repeated or performed in parallel with one another or in parallel with different instances of the same or similar steps. The scope of the invention is, therefore indicated by the appended claims rather than the foregoing description. All changes that come with the meaning and range of equivalency of the claims are to be embraced within their scope.

What is claimed is:

1. A method for generating image capture device parameter suggestions from a digital input image using pattern recognition algorithms, the method comprising:

(a) receiving a plurality of training images defining one or many aesthetic styles along with a description of variations from exemplar image capture device parameters each image represents,
(b) training a feature extraction algorithm to extract visual features common to the given aesthetic styles and their image capture device variations utilizing said training images,
(c) training a discriminator algorithm to determine a similarity function for images based on said extracted visual features,
(d) extracting said visual features from an input image utilizing said feature extraction algorithm,
(e) determining a similarity measure between the input image visual features and one or more aesthetic style variation visual features utilizing said discriminator algorithm,
(f) determining the image capture suggestions as a function of said similarity measure,
whereby image capture suggestions are derived based on aesthetic characteristics of said training images.

2. The method of claim 1, wherein the training of the discriminator algorithm comprises constructing a training structure including a classification loss model, a regression loss model, or a combination of the two, wherein:
the classification loss model compares the relative difference in classifications for the training images; and
the regression loss model minimizes a difference between predicted variation amounts and the variation amounts of the training images.

3. The method of claim 1, wherein said feature extraction algorithm and said discriminator algorithm are trained as a single composite algorithm, said composite algorithm receives an image and produces said similarity measure.

4. The method of claim 1, further comprising determining a similarity measure of said input image to one or more aesthetic styles.

5. The method of claim 4, further comprising using the similarity measure between the input image and one or more aesthetic styles as input to a function that will compose the image capture suggestions generated from multiple aesthetic styles into a single image capture suggestion.

6. The method of claim 1, further comprising presenting said image capture suggestions to a user.

7. The method of claim 1, wherein the feature extraction algorithm and/or the discriminator algorithm is embodied in whole or in part as a neural network machine learning model.

8. The method of claim 1, wherein the image capture suggestions comprises one or more suggestions with respect to characteristics of a camera used to capture the input image.

9. The method of claim 1, wherein the image capture suggestions comprises one or more suggestions with respect to characteristics of a plurality of lights used to illuminate the scene depicted in the input image.

10. The method of claim 1, wherein the image capture suggestions comprises one or more suggestions with respect to characteristics of a subject captured in the input image, wherein the characteristics are selected from a group consisting of: relative position of the subject to the camera, relative position of the subject to another object in the scene, and orientation of the subject to the camera.

11. A tangible, non-transitory computer-readable medium in which is computer program code is stored that, when executed by a computer processor, causes performance of a method for generating image capture device parameter suggestions from a digital input image using pattern matching algorithms, the method comprising:
- (a) receiving a plurality of training images defining one or many aesthetic styles along with a description of variations from exemplar image capture device parameters each image represents,
- (b) training a feature extraction algorithm to extract visual features common to the given aesthetic styles and their image capture device variations utilizing said training images,
- (c) training a discriminator algorithm to determine a similarity function for images based on said extracted visual features,
- (d) extracting said visual features from an input image utilizing said feature extraction algorithm,
- (e) determining a similarity measure between the input image visual features and one or more aesthetic style variation visual features utilizing said discriminator algorithm,
- (f) determining the image capture suggestions as a function of said similarity measure, whereby image capture suggestions are derived based on aesthetic characteristics of said training images.

12. The medium of claim 11, wherein the training of the discriminator algorithm comprises constructing a training structure including a classification loss model, a regression loss model, or a combination of the two, wherein:
the classification loss model compares the relative difference in classifications for the training images; and
the regression loss model minimizes a difference between predicted variation amounts and the variation amounts of the training images.

13. The medium of claim 11, wherein said feature extraction algorithm and said discriminator algorithm are trained as a single composite algorithm, said composite algorithm receives an image and produces said similarity measure.

14. The medium of claim 11, wherein the image capture suggestions comprises one or more suggestions with respect to characteristics of a camera used to capture the input image.

15. The medium of claim 11, wherein the image capture suggestions comprises one or more suggestions with respect to characteristics of a plurality of lights used to illuminate the scene depicted in the input image.

16. The medium of claim 11, wherein the feature extraction algorithm and/or the discriminator algorithm is embodied in whole or in part as a neural network machine learning model.

17. A system for generating image capture device parameter suggestions from a digital input image using pattern matching algorithms, the system comprising:
at least one processor;
a non-transitory storage medium comprising instructions that, when executed by the at least one processor, cause the system to:
- (a) receiving a plurality of training images defining one or many aesthetic styles along with a description of variations from exemplar image capture device parameters each image represents,
- (b) training a feature extraction algorithm to extract visual features common to the given aesthetic styles and their image capture device variations utilizing said training images,
- (c) training a discriminator algorithm to determine a similarity function for images based on said extracted visual features,
- (d) extracting said visual features from an input image utilizing said feature extraction algorithm,
- (e) determining a similarity measure between the input image visual features and one or more aesthetic style variation visual features utilizing said discriminator algorithm,
- (f) determining the image capture suggestions as a function of said similarity measure, whereby image capture suggestions are derived based on aesthetic characteristics of said training images.

18. The system as recited in claim 17, further comprising a means for presenting said image capture suggestions to the user.

19. The system as recited in claim 17, further comprising a means to present said image capture suggestions to the subject of the input image.

20. The system as recited in claim 17, further comprising a means to control am automated camera platform with said image capture suggestions.

* * * * *